Figure 1:
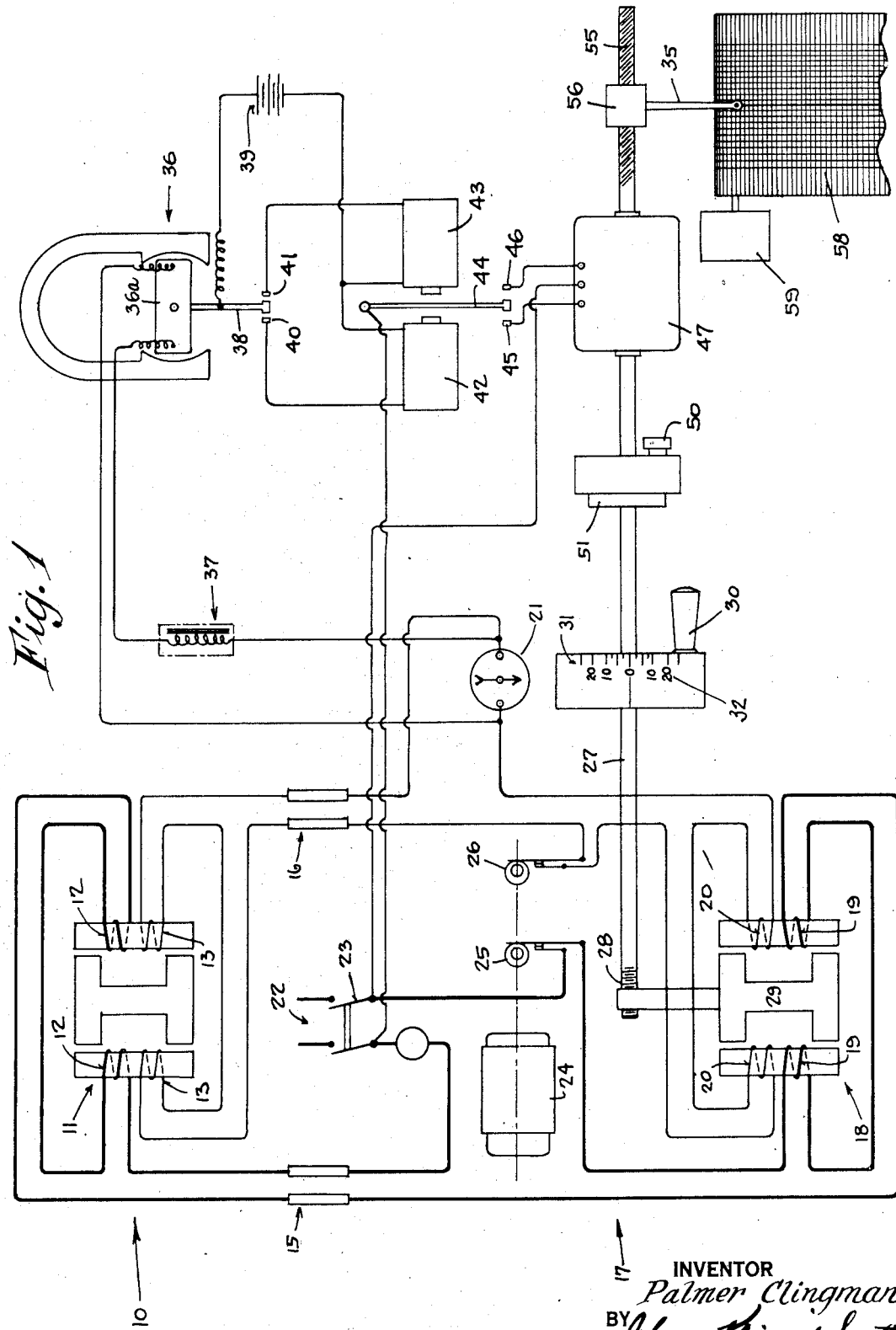

July 18, 1944.  P. CLINGMAN  2,353,691

TORSIONMETER

Filed Jan. 19, 1942

INVENTOR
Palmer Clingman
BY
Johnson, Klein and Smyth
ATTORNEYS

Patented July 18, 1944

2,353,691

UNITED STATES PATENT OFFICE 2,353,691

TORSION METER

Palmer Clingman, Fairfield, Conn.

Application January 19, 1942, Serial No. 427,251

5 Claims. (Cl. 265—4)

The present invention relates to improvements in electric torsionmeters and more particularly to torsionmeters of the "Ford" type.

In torsionmeters of this type, the angle of torsion of the shaft is measured, and by means of suitable known factors the horsepower may be computed. The angle of torsion in the exemplary "Ford" device is measured by means of a normally balanced electrical circuit which is unbalanced in proportion to the amount of twist existing in the shaft on which the test is being made. The unbalanced circuit is rebalanced and the amounts of change of the condition of the circuit required to rebalance it form the measurement of the twist of the shaft and the basis for the computation of the developed horsepower.

Heretofore, it was the custom to have tests at predetermined times by an operator manually adjusting and observing the instrument and plotting the results on a chart. This did not give a continuous or accurate record, but merely a spot-check which was more or less approximate, depending upon the frequency and regularity with which the tests were made and the skill and care of the operator in making and noting the results of the test.

The present invention seeks to eliminate the human element in the indicating and recording of developed horsepower and provides an automatic adjusting and recording means for such a torsionmeter, and utilizes the unbalance of the torsionmeter system resulting from a change in torque in the shaft to set in motion the means for rebalancing the system. This means preferably has associated therewith a recording mechanism for making a continuous record of the measurements made by the device so that not only is the operator relieved from adjusting the devices to rebalance, but is also relieved from noting and plotting the results.

In the form of the invention herein illustrated as exemplary thereof, a detector device is included in the balanced system of the torsionmeter, and, upon an unbalance thereof, sets in motion a power operator for the rebalancing means. By having a very sensitive and responsive detector the rebalancing means may be made to so quickly operate that the rebalancing is practically instantaneous with the change in torque. A recording means operated simultaneously with the rebalancing means records the twist or torque in the shaft continuously while the test is being made.

Preferably, the power operator for the automatic adjusting means can be rendered inoperative so that the torsionmeter can be rebalanced manually whenever desired.

Another feature of the present invention resides in the simplified construction of the control and recording means which can be readily installed and attached to an existing torsionmeter or made as a standard part thereof.

Other features and advantages of the invention will be apparent from the specification and claims when considered in connection with the drawing in which the only figure shows a diagrammatic view of the torsionmeter and control and record means therefor.

At the lefthand side of the drawing is shown a diagrammatic representation of a "Ford" torsionmeter. This includes a shaft unit 10 having a differential transformer 11. The primaries 12 of the transformer are connected together to give the same polarity, and the secondaries 13 are connected in opposition so that with a normal air gap there is no current flowing in the secondary circuit. The transformer is mounted on the shaft being measured in such a manner that the twist in the shaft will cause a variation in the air gap from normal producing a change in the magnetic flux and consequently a change in the secondary current.

The primaries and secondaries of the transformer 11 are connected by slip rings 15, 16 to the indicator unit 17 which includes a similar differential transformer 18 having its primaries 19 connected to have the same polarity and the secondaries 20 are connected in opposition as in the transformer mounted on the shaft.

The primary and secondary circuits are thus connected in series and the secondaries in the two units are so arranged that with the device in a normal position there will be a balanced condition therein and no current will flow in the secondary circuit. A galvanometer is included in the circuit as a balance-indicating instrument 21.

A suitable power supply 22 is connected to the primary circuit by a switch 23. Herein the supply is shown as a D. C. supply and a motor 24 operates an interrupter 25 in the primary circuit so as to produce pulsating current in the primaries of the transformers. The secondary circuit also includes an interrupter 26 operated by the motor in timed relation to interruptor 25 for the purpose of, in effect, rectifying the secondary current so that the balance-indicating instrument 21 will receive direct current.

The indicator unit is provided with means for adjusting the air gap of the transformer 18 to balance and rebalance the secondary circuit.

This means includes a rotatable shaft 27 having a micrometer screw 28 at the end thereof to which is connected a pole piece 29 for varying the air gap in the transformer 18. A manual operator 30 is secured to the shaft for rotating the same.

When the device is initially installed and the shaft is at rest, the air gap in the transformer is so adjusted that the balance-indicating instrument indicates zero. As soon as the power shaft is rotated and delivers power, the twist in the shaft causes the air gap in the shaft unit 10 to change and the secondary current in the transformer becomes unbalanced so that current flows in a secondary circuit. This will be shown by the balance-indicating instrument moving from its zero position.

The manual operator in the indicating unit is turned and the shiftable pole piece moved until a similar condition exists in the transformer 18 as in the one in the shaft unit and a balanced condition again exists in the secondary circuit as indicated by the return to zero position of the balance-indicating instrument.

A scale 31 is carried by the shaft and is provided with graduations 32 which represent the amount of twist in the power shaft. By knowing the stiffness of the shaft material and the R. P. M., the horsepower can be readily computed.

Thus far, the device described is the normal "Ford" torsionmeter.

It has been desirable in making accurate test runs that a continuous record of the angle of torsion in the shaft and the horsepower delivered be kept. Accordingly, the present invention has provided an automatically operated means for rebalancing the secondary circuit, which means also operates a pen 35 or the like recording instrument to make an accurate continuous record of the operation.

In accomplishing this result, the secondary circuit has inserted therein a sensitive galvanometer 36. If desired, a choke system, diagrammatically illustrated at 37, can be inserted in the circuit to smooth out the current in the circuit.

The movable element 36a of the galvanometer is formed as a contact 38 which is connected to one side of a source of current 39 adapted to cooperate with a pair of spaced contacts 40, 41 upon movement of the galvanometer in either direction from its normal or zero position. The contacts 40, 41 are connected to two solenoids 42, 43, which are connected to the other side of the source 39. The solenoids are disposed on opposite sides of a pivoted contactor 44, which, upon energization of the solenoids, is moved from its normal position into either of two positions in which it engages contacts 45, 46 connected to the fields of a reversible adjusting motor 47, for controlling the direction of rotation thereof.

The motor, which may be of any desired type, is so positioned that it can be easily connected to the shaft 27. Preferably, the connection is a releasable one. As diagrammatically illustrated, it may comprise a spring pressed pin 50 engaging a disk 51 on the shaft 27 to be locked thereto, but, upon being released, will permit rotation of the shaft by operator 30 so that the torsionmeter may be manually adjusted.

If it should be desired, as when the device is being initially set up, to rebalance the secondary circuit by manually adjusting the pole piece of the indicating unit transformer, the coupling pin 50 can be readily released and the manual operation performed.

With the device of the present invention, small twists in the power shaft will produce a small current in the secondary circuit and will cause the sensitive galvanometer 36 to move to the right or left, depending upon the direction of twist of the shaft. This current, while not sufficient to energize the solenoids, will move the contact 38 into engagement with contact 40 or 41 and close the circuit to either the solenoid 42 or solenoid 43, through the battery 39.

Means, not shown, may be provided for holding the galvanometer needle in engagement with one or the other of the contacts to insure a good electrical connection therewith.

Upon energization of solenoid 42, or 43, the pivoted contact 44 will be moved to the right or left to engage contact 45 or 46 and energize the proper field of the motor 47, or short circuit a field of the motor 47, depending upon the system used, to cause the motor to be rotated in a proper direction to drive the micrometer screw and cause the pole piece to move in the direction to rebalance the system.

As soon as a rebalance is obtained, the galvanometer 36 will return to neutral position and the circuit to the solenoids will be opened, thus opening the control circuit for the motor and stopping the rebalancing operation.

According to the present invention, a continuous record of the amount of rebalance, which is a measure of the twist in the shaft, is made by providing the adjusting motor 47 with a feed screw 55 upon which a recording pen carriage 56 carrying pen 35 is mounted to cooperate with a strip chart 58 continuously driven by suitable timing mechanism 59. This will provide a permanent record which will indicate the amount and change in twist throughout the entire test while the scale 32 will show the units of twist at any instant.

The automatic control means of the present invention may be readily applied to existing torsionmeters, or supplied as standard equipment with new torsionmeters. To provide an existing torsionmeter with the control device involves merely the connecting of the leads of the galvanometer 36 to the secondary circuit and connecting the motor through the releasable connector 50, 51, to the shaft 27.

It will be noted that the feed screw 55 is mechanically connected to the shaft 27 through the motor shaft and coupling means so that if the automatic control becomes ineffective the continuous record can be made by having an operator continuously adjust the rebalancing means manually.

Variations and modifications may be made within the scope of this invention and portions of the improvements may be used without others.

I claim:

1. An electrical torsionmeter for use with a power shaft comprising a bridge circuit having a pair of differential transformers therein with the secondaries connected together and normally balanced so that no current flows therein; means responsive to the twist in the shaft for unbalancing the bridge circuit and causing current to flow in said secondary circuit; means for rebalancing the bridge circuit; and means connected in said secondary circuit and responsive to current flow in said circuit for automatically controlling the last-named means, and including means for indicating and recording the amount of twist in said shaft.

2. An electrical torsionmeter for use with a power shaft comprising a bridge circuit having a pair of differential transformers therein with the secondaries connected together and normally balanced so that no current flows therein; means responsive to the twist in the shaft for varying the air gap in one of the transformers and unbalancing the bridge circuit whereby current flows in said secondary circuit; means for adjusting the air gap in the other transformer for rebalancing the bridge circuit; and means responsive to the current flow in said secondary circuit for automatically operating the last-named means; and means controlled by said current responsive means for recording the amount of twist in said shaft.

3. An electrical torsion-responsive device for use with a power shaft comprising a bridge circuit having a pair of differential transformers therein with the secondary coils connected together and normally balanced so that no current flows therein; means responsive to the twist in the shaft for unbalancing the bridge circuit and causing current to flow in said secondary circuit; means for rebalancing the bridge circuit, including a reversible motor; and means responsive to current flow in said secondary coil circuit for controlling the rotation and direction of said motor for actuating the last-named means.

4. An electrical torsionmeter for a power shaft comprising a bridge circuit including a pair of differential transformers having their secondaries connected together and normally balanced so that no current flows in the secondary circuit and a balance-indicating instrument in said secondary circuit, one of said transformers being mounted on the shaft and operable upon a twist in the shaft to unbalance the bridge circuit and cause current to flow in said secondary circuit; means associated with the other transformer for returning the bridge circuit to balanced condition as indicated by the balance-indicating instrument; manually operable means for actuating said last-named means; a power operator; means for releasably connecting the power operator to said manually operable means to actuate the same; current-responsive means in said secondary circuit and actuated by the current flow therein for controlling the operation of said power operator to automatically restore a balanced condition; and means controlled by said current responsive means for indicating and recording the degree of twist in said shaft.

5. An electrical torsionmeter for a power shaft comprising a bridge circuit including a pair of differential transformers therein with the secondaries connected together and normally balanced so that no current flows in the secondary circuit, one of said transformers being mounted on the shaft and operable upon a twist in the shaft to unbalance the bridge circuit and cause current to flow in said secondary circuit; means associated with the other transformer for returning the bridge circuit to balanced condition; manually operable means for actuating said last-named means; means for automatically rebalancing said circuit including a reversible motor releasably connected to said manually operable means to actuate the same and control means therefor comprising current-responsive means in said secondary circuit and operated by current flow therein to regulate the direction and extent of rotation of said motor to restore a balanced condition; and means controlled by said current responsive means for indicating and recording the degree of twist in said shaft.

PALMER CLINGMAN.